US006609100B2

(12) United States Patent
Smith et al.

(10) Patent No.: US 6,609,100 B2
(45) Date of Patent: Aug. 19, 2003

(54) PROGRAM PLANNING MANAGEMENT SYSTEM

(75) Inventors: Lloyd E. Smith, Vestal, NY (US); Edward W. Balunas, Apalachin, NY (US)

(73) Assignee: Lockhead Martin Corporation, Bethesda, MD (US)

( * ) Notice: Subject to any disclaimer, the term of this patent is extended or adjusted under 35 U.S.C. 154(b) by 0 days.

(21) Appl. No.: 08/812,622

(22) Filed: Mar. 7, 1997

(65) Prior Publication Data

US 2002/0062239 A1 May 23, 2002

(51) Int. Cl.[7] ............................................... G06F 17/60
(52) U.S. Cl. ......................................................... 705/8
(58) Field of Search ........................ 705/1, 7–9; 707/1; 345/963

(56) References Cited

U.S. PATENT DOCUMENTS

| | | | | |
|---|---|---|---|---|
| 3,558,829 A | * | 1/1971 | Aro | 379/201 |
| 4,701,840 A | | 10/1987 | Boebert et al. | 713/200 |
| 5,099,431 A | | 3/1992 | Natarajan | 700/105 |

(List continued on next page.)

FOREIGN PATENT DOCUMENTS

EP 0 306 965 * 3/1989

OTHER PUBLICATIONS

At the Office: Using Scheduler+ 95, vol. 6, No. 11, Nov. 1995. Downloaded from Internet <URL://www.smartcomputing.com/editorial/article.asp?article=articles%2F1995%2Fnov95%2Fpcn1116%2Fpcn1116%2Easp&guid=dkjdrmx4&searchtype=0&WordListxscheduler>.*

At the Office: Scheduling Programs, vol. 5, No. 2, Feb. 1994. Downloaded from Internet <URL:http://www.smartcomputing.com/editorial/article.asp?article=articles%2F1994%2Ffeb94%2Fpcn0223%2Fpcn0223%2Easp&guid=dkjdrmx4&searchtype=0Wordlist=scheduler>.*

George, McDaniel (editor). IBM Dictionary of Computing. "Scratch–pad memory." McGraw–Hill Publishing, 1993, p. 598.*

Housman, Judy. "A template on the agenda?" PC Computing, vol. 2, No. 9, p. 60, Sep. 1989.*

Garland, Jeffrey K. and Dr. Frank W. Calliss. "Improved change tracking for software maintenance." Proceedings of the Conference on Software Maintenance, Oct. 1991, pp. 32–41.*

"Simpler project managers in sight (Symantec introduces Guide Line and Guide Line Maker project management software packages." PC User, No. 203, p. 18, Jan. 27, 1993.*

(List continued on next page.)

Primary Examiner—Tariq R. Hafiz
Assistant Examiner—Susanna Meinecke-Díaz
(74) Attorney, Agent, or Firm—Whitham, Curtis & Christofferson, P.C.

(57) ABSTRACT

A data processing system provides development of complex schedule plans under user control by using sorting and grouping processing to interface between a relational database and a scheduler application. The sorting and grouping processing provides for user-interactive editing of data in the database by presentation of groupings of activities developed in accordance with attributes of the activities concurrently with activities which are not included in a group. Editing of the group based on the presentation of other activities allows the user to apply acquired knowledge and understanding of the subtleties and dynamics of the activities and to make business decisions which therefore do not need to be represented in the scheduler application. Changes to data in the database are logged in a notebook or scratch-pad store so that data may be returned to its original or any prior state.

38 Claims, 15 Drawing Sheets

U.S. PATENT DOCUMENTS

| | | | | |
|---|---|---|---|---|
| 5,182,705 A | * | 1/1993 | Barr et al. | 705/11 |
| 5,201,046 A | * | 4/1993 | Goldberg | 707/100 |
| 5,216,612 A | | 6/1993 | Cornett et al. | 700/96 |
| 5,408,663 A | | 4/1995 | Miller | 709/104 |
| 5,412,758 A | | 5/1995 | Srikanth et al. | 706/59 |
| 5,414,843 A | | 5/1995 | Nakamura et al. | 707/104 |
| 5,440,681 A | | 8/1995 | Kudo | 705/8 |
| 5,446,886 A | * | 8/1995 | Li | 707/2 |
| 5,490,097 A | | 2/1996 | Swenson et al. | 703/2 |
| 5,530,861 A | * | 6/1996 | Diamant et al. | 705/8 |
| 5,560,005 A | * | 9/1996 | Hoover | 707/10 |
| 5,623,413 A | * | 4/1997 | Matheson et al. | 701/117 |
| 5,649,182 A | * | 7/1997 | Reitz | 707/7 |
| 5,655,118 A | * | 8/1997 | Heindel et al. | 395/614 |
| 5,659,768 A | * | 8/1997 | Forbes et al. | 345/963 |
| 5,671,361 A | * | 9/1997 | Brown et al. | 705/9 |
| 5,692,125 A | * | 11/1997 | Schloss et al. | 705/9 |
| 5,701,400 A | * | 12/1997 | Amado | 706/45 |
| 5,737,728 A | * | 4/1998 | Sisley et al. | 705/8 |
| 5,745,110 A | * | 4/1998 | Ertemalp | 345/340 |
| 5,752,026 A | * | 5/1998 | Fortier | 707/103 |
| 5,761,653 A | * | 6/1998 | Schiefer | 707/2 |
| 5,765,139 A | * | 6/1998 | Bondy | 705/8 |
| 5,799,309 A | * | 8/1998 | Srinivasan | 707/102 |
| 5,818,715 A | * | 10/1998 | Marshall et al. | 705/8 |
| 5,826,236 A | * | 10/1998 | Narimatsu et al. | 705/8 |
| 5,826,252 A | * | 10/1998 | Wolters, Jr. et al. | 707/1 |
| 5,835,898 A | * | 11/1998 | Borg et al. | 705/8 |
| 5,890,131 A | * | 3/1999 | Ebert et al. | 705/7 |
| 5,890,134 A | * | 3/1999 | Fox | 705/9 |
| 5,893,074 A | * | 4/1999 | Hughes et al. | 705/8 |
| 5,923,552 A | * | 7/1999 | Brown et al. | 700/100 |
| 5,936,625 A | * | 8/1999 | Kahl et al. | 345/963 |

OTHER PUBLICATIONS

Mosig, W.R., Jr. "Software review—Guide Line for Windows." Cost Engineering, vol. 35, No. 5, p. 6, May 1993.*

Pinnell, Terry. "Versatile way to manage projects: Customising project management in Time Line 6.0." PC User, No. 242, p. 85–, Sep. 7, 1994.*

Roapoza, Jim. "Time Line's ODBC support, flexibility make it easier to to manage projects." PC Week, vol. 12, No. 41, p. 89–, Oct. 16, 1995.*

Garland, Jeffrey; "Improved Change Tracking for Software Maintenance," IEEE, pp. 32–41, Aug. 1991.*

* cited by examiner

FIG. 7

Project Name: IFPS
Mod ID: 17
Priority: 12

Acquisition Data
Data Source: AFSOC
☑ Funded  ☐ Active acquisition cycle
☐ Contracted  ☑ Driver Mod
☐ Standalone Mod
☑ Include in grouping

Technical Definition
Complexity: major
☐ Group A Affected:
☑ Group B Affected:
☑ Software Affected
☑ Flight Test Required  ☑ Developmental
☐ Operational
☑ Human Factors Affected

Installation Information
TCTO Type: record
Installer: contractor
Technicians:
☑ Electrical
☑ Mechanical
☑ Structural
☑ Quality Areas Affected by Mod
*** flight deck
forward cargo bay
fuselage exterior
*** underdeck Possible Install Locations
Depot
Contracted Site
Contractor Facility Mod Facility: Homestation

Cost Date  Schedule Date  Technical Data

Program Risk
Cost: no eval
Schedule: no eval
Technical: no eval

Other Activities Affected

Technical Orders Affected
Affected TO
1C-130(M)H-1
1C-130(M)H-1-1

Baseline Documents Affected
System Specification

Additional Information

Dependents
Predecessor Mod: 27
Concurrent Mod:
Start No Earlier Than:
Finish No Later Than: 12-Mar-99

Driver Selection

Driver mods sorted by install date

| | Project | Priority | Install Start | Funded | Active |
|---|---|---|---|---|---|
| | ALE-40 Lifeline | 92 | 01-Apr-96 | ☑ | ☑ |
| | DIRCM Immediate Infared Jamming System Improvement | 26 | 01-Jun-97 | ☑ | ☑ |
| ▲ | Communications Upgrad | 105 | 01-Jun-98 | ☑ | ☑ |
| | Tanker Upgrade Air to Air Refueling (AAR) | 134 | 01-Apr-00 | ☑ | ☐ |
| | MATT (Multi-Mission Advanced Tactical Terminal) | 40 | 01-Jan-02 | ☑ | ☐ |
| | IFPS | 12 | 01-Jun-05 | ☑ | ☐ |

Add  Remove  🛑  👆

Non-driver mods sorted by Priority

| | Project | Priority | Install Start | Funded | Active |
|---|---|---|---|---|---|
| ▲ | AAR-44 (MWP Top Mount Ant) | 72 | 01-Feb-99 | ☑ | ☐ |
| | ALQ-172 (FCP-93 Flightline programming / LBJ) | 84 | 01-Jan-98 | ☑ | ☐ |
| | ALE-47 Chaff and Flare Dispensers | 121 | 01-Oct-00 | ☑ | ☐ |
| | Safe | 226 | | ☑ | ☐ |
| | Low Band Jammer | 500 | | ☑ | ☐ |
| | 3.5" DTS Nav Upgrade | | 01-Oct-97 | ☑ | ☑ |
| | Acoustic Noise Modification | | | ☑ | ☐ |
| | ADS Arms | | 01-Dec-95 | ☑ | ☑ |

FIG.10

Consider Mods by Mod Area

Driver: ALE-40 Lifeline    Current Group: 1

Current Group mods affecting Mod Area  << Show all Mods >>    Group Install Date: 01-Apr-98

| Project | Priority | Funded | Active | |
|---|---|---|---|---|
| Acoustic Noise Modification | | ☑ | ☑ | |
| ADS Arms | | ☑ | ☑ | |
| AERP (Aircrew Eye/Respiratory Protection) | | ☑ | ☑ | |
| ALE-40 Lifeline | 92 | ☑ | ☑ | |
| APR-46 Antenna Rotation | | ☑ | ☑ | |
| APR-46 Water Intrusion | | | ☑ | |
| H+Pack Installation | | ☑ | ☑ | |

[Remove From Group]  [Review Group]  (STOP)

Future Group mods in the same mod area

| Project | Install Start | Priority | Funded | Active | Driver |
|---|---|---|---|---|---|
| 3.5" DTS New Update | 01-Oct-97 | | | | ☑ |
| AAH-44 (MWR Top Mount Ant.) | 01-Feb-99 | 72 | ☑ | | ☑ |
| ALE-47 Chaff and Flare Dispensers | 01-Oct-00 | 121 | ☑ | | ☑ |
| ALQ-172 (ECP-93 Flightline programming / LBJ) | 01-Jan-98 | 84 | ☑ | ☑ | ☑ |
| APU Upgrade | 01-Jun-98 | 105 | ☑ | | ☑ |
| Communications Upgrade | 01-Jun-97 | 26 | ☑ | | ☑ |
| DIRCM Immediate Infrared Jamming System Improvemen | 01-Jun-05 | 12 | ☑ | | ☑ |
| IFPS | | | | | ☑ |
| Low Band Jammer | | 500 | ☑ | | ☑ |
| MATT (Multi-Mission Advanced Tactical Terminal) | 01-Jan-02 | 40 | ☑ | | ☑ |

FIG. 11

Consider Flight Test Impact

Driver: ALE-40 Lifeline          Current Group: 1

Current group mods requiring Flight Test          Group Install Date: 01-Apr-98

| PROJECT | DT&E | OT&E | PRIORITY | FUNDED | ACTIVE |
|---|---|---|---|---|---|

[Remove From Group]

[Review Group]

[STOP]   [👆]

Future Group mods in the same mod area

| | PROJECT | INSTALL START | DT&E | OT&E | PRIORITY | FUNDED | ACTIVE | DRIVER |
|---|---|---|---|---|---|---|---|---|
| △ | AAR-44 (MWR Top Mount Ant.) | 01-Feb-99 | ☐ | ☐ | 72 | ☑ | ☐ | ☐ |
| | DIRCM Immediate Infrared Jamming System Improvement | 01-Jun-97 | ☐ | ☐ | 26 | ☑ | ☑ | ☑ |
| | IFPS | 01-Jun-05 | ☐ | ☐ | 12 | ☑ | ☐ | ☐ |
| | Low Band Jammer | | ☐ | ☐ | 500 | ☑ | ☐ | ☑ |
| | MATT (Multi-Mission Advanced Tactical Terminal) | 01-Jan-02 | ☐ | ☐ | 40 | ☑ | ☐ | ☐ |
| | Tanker Upgrade Air to Air Refueling (AAR) | 01-Apr-00 | ☐ | ☐ | 134 | ☑ | ☐ | ☑ |

FIG. 12

Select Group Install Location

Driver: ALE-40 Lifeline          Group: 1

Mods which may be performed at selected location

| Project | Installed | Priority | Funded | Active |
|---|---|---|---|---|
| ▲ AERP (Aircrew Eye/Respiratory Protection) | user | | | |
| H+ Pack Installation | depot team | | ☑ | ☑ |
| RFOBX (Reverse Flow Overboard Exhaust) | depot team | | ☑ | ☑ |
| APR-46 Water Intrusion | depot team | | ☑ | ☑ |
| APR-46 Antenna Rotation | depot team | | ☑ | ☑ |
| ADS Arms | depot team | | ☑ | ☑ |

[Add to Group]   [Remove From Group]   [Review Groups]   [STOP]

Mods which cannot be performed at selected location

| Project | Installed | Priority | Funded | Active |
|---|---|---|---|---|
| ▲ ALE-40 Lifeline | depot team | 92 | ☑ | ☑ |
| Acoustic Noise Modification | contractor | | ☑ | ☑ |

Group Location

○ HOME STATION    ○ CONTRACTED SITE    ○

Consider Group Install Duration

Group: 1  
Driver: ALE-40 Lifeline  
Group Install Date: 01-Apr-96  
Group: 1

Mods Included in Group

| | Project | MOD TYPE | COMPLEXITY | INSTALL PERIOD |
|---|---|---|---|---|
| △ | ALE-40 Lifeline | record | major | 10 |
| | AERP (Aircrew Eye/Respiratory Protection) | routine | minor | 2 |
| | H+ Pack Installation | routine | major | 10 |
| | RFOBX (Reverse Flow Overboard Exhaust) | routine | major | 10 |
| | Acoustic Noise Modification | record | minor | 3 |
| | APR-46 Water Intrusion | routine | major | 2 |
| | APR-46 Antenna Rotation | routine | major | 2 |
| | ADS Arms | routine | minor | 3 |

First AC Install Multiplier: 200%  
Second AC Install Log: 20 Days

Sum of Mod Install Periods: 42  
Group Install Reduction Factor: 80%  
Group Install Period: 34 Work Days Review Groups

FIG.13

Consider Finish No Later Than Violations

Group: 1  Group Install Date: 01-Apr-96  Group Install Period: 34

Driver: ALE-40 Lifeline  Group Install End Date: 14-Aug-97

Finish No Later Than Violations

| Project | Finish By | Priority | Funded | Active |
|---|---|---|---|---|

[Remove From Group]  [Review Groups]  [STOP]  👉

Other Group Mods

| Project | Install Period | Priority | Funded | Active |
|---|---|---|---|---|
| ⚠ ALE-40 Lifeline | 10 | 92 | ☑ | ☑ |
| AERP (Aircrew Eye/Respiratory Protection) | 2 | | ☑ | ☑ |
| H+ Pack Installation | 10 | | ☑ | ☑ |
| RFORX (Reverse Flow Overboard Exhaust) | 10 | | ☑ | ☑ |
| Acoustic Noise Modification | 3 | | ☑ | ☑ |
| APR-46 Water Instrusion | 2 | | ☑ | ☑ |
| APR-46 Antenna Rotation | 2 | | ☑ | ☑ |
| ADS Arms | 3 | | ☑ | ☑ |

Resolve Driver Overlap

Group: [ ]  Driver: ALE-40 Lifeline
Group Install Date: 01-Apr-96  Group Install Period: 34  End Date: 34

Group: [ ]  Driver: DIRCM Immediate Infared Jamming System Improvement
Group Install Date: 01-Jun-97  Group Install Period: 20

Group Process Status

| Group | Driver Mod | Install Date | Duration | Location |
|---|---|---|---|---|
| △ 1 | ALE-40 Lifeline | 04/01/1996 | 34 Days | Depot |
| 2 | DIRCM Immediate Infared Jamming System Improv | 06/01/1997 | 20 Days | Depot |
| 3 | Communications Upgrade | 06/01/1998 | 15 Days | Depot |
| 4 | Tanker Upgrade Air to Air Refueling (AAR) | 04/01/2000 | 20 Days | Depot |
| 5 | MATT (Multi-Mission Advanced Tactical Terminal) | 01/01/2002 | 10 Days | Depot |
| 6 | IFPS | 06/01/2005 | 10 Days | Depot |

[Follow the Previous Driver] [Allocate Additional Aircraft] [Remove Last Driver and Free Grouped Mods] [Remove This Mod as a Driver] [STOP]

PROGRAM PLANNING MANAGEMENT SYSTEM

This invention was made with Government support under contract F336657-83-C-0264 awarded by the U.S. Air Force. The Government has certain rights in this invention.

BACKGROUND OF THE INVENTION

1. Field of the Invention

The present invention generally relates to scheduling systems and, more particularly, to computer systems for developing, managing and periodically modifying complex schedules and projects.

2. Description of the Prior Art

Programmed data processors have long been used to store and selectively present portions of potentially massive quantities of data and to carry out lengthy and complex data processing tasks in which a series of operations must be carried out in a particular sequence. Among these types of tasks, the development of schedules for carrying out a particular course of action or plan is often especially complex. As a practical matter, numerous concerns may present conflicting requirements such as when a project and activities therein must be carried out concurrently with continued operations of a business.

For example, consider a manufacturer or operator of aircraft (or any other fleet of vehicles or other plurality of similar objects) which must oversee maintenance of aircraft which have been placed in service by the manufacturer's customers. Modifications and upgrades will often be designed and implemented on a more-or-less continual basis to enhance safety and performance of the aircraft or to meet particular performance requirements and it is desirable that all previously built aircraft receive such modifications in a timely fashion while maintaining an adequate number of aircraft in service at all times which is sufficient to support the customer's business. It is also often desirable in implementing modifications that as few modification states as possible exist in the fleet of aircraft or plurality of objects and frequently only a maximum of only two modification states are permitted at any time.

In this particular example, it should be understood that modifications and service of aircraft is particularly subject to complication by the complexity and size of commercial aircraft and process criticality of maintenance and modifications. Not only does service and modification often require disassembly of significant portions of the aircraft but special tools and facilities are often required which may be available at only a few locations nationwide. Further, modifications and upgrades often involve lead-time for design, fabrication and distribution of parts of as long as several years and which may be extended by the process of funding of such activities. Therefore, at any given time, many such upgrades or modifications may be planned or in process and modifications must generally be coordinated with regular maintenance schedules both as to timing and location. Additionally, some modifications may rely on others being carried out earlier or concurrently and may also involve training of flight crews as well as personnel to carry out the modifications or maintenance. Flight testing and other processes of validation and approval for the modification, which can be extremely expensive, may also be required.

Accordingly, it is seen that service and upgrading of aircraft, in particular, takes on the form of an ongoing complex plan which may extend over many years (e.g. the entire service life of the aircraft including the period of its original design, manufacture and certification). Further, each of the above potential complications, requirements and dependencies of activities within the plan (referred to as an attribute of an activity) of each service or modification and many others must be considered in the formulation and alterations of the plan from time to time as business contingencies and capabilities may permit or require.

It can therefore be readily understood that the complexity of the overall plan or schedule increases rapidly with each of the number of objects under the plan, the number of attributes of each action to be taken, the number of activities or actions to be carried out on the objects and the length of time over which the plan extends. If the plan is generated by manual methods, as is the current practice, such increase of complexity increases the time required to do so and greatly increases the likelihood of error. Any change in attributes or the addition or alteration of any modification may require most, if not all, of the schedule generation process to be repeated. As a practical matter, frequency of plan or schedule changes encountered in maintenance and modification of even a small fleet of aircraft and many other business endeavors is such that the plan or schedule is seldom current or accurate. Foreseeable increases in numbers of attributes which must be considered in a schedule plan are such that the frequency of changes may exceed the rate at which the plan or schedule can be updated using manual methods.

Therefore use of data processors to generate schedules has been attempted in recent years but has achieved little success for schedules of more than low complexity. Approaches to date have generally involved programming the computer to make all of the logical decisions in grouping and scheduling of activities. However, this type of approach requires the logical combinations applicable to the attributes of the activities to be embodied in the programming and results in program complexity approaching that of a neural network for relatively modest numbers of objects, activities and attributes of the activities. Such programming requires extensive definition of the individual activities and elaborate and complicated decision-making algorithms. These complexities of programming require substantial development time and expense for the program and large hardware and computational overhead while resulting in a program which has little flexibility, limited applicability, requires extensive and costly changes to accommodate any alteration of data or logic and does not easily accommodate user interaction to permit business decisions to be used or their effect to be evaluated in the course of schedule development. Additionally, such systems do not ordinarily support communication of the schedule in a timely fashion when changes in the schedule are made.

SUMMARY OF THE INVENTION

It is therefore an object of the present invention to provide an easily alterable, flexible system for supporting the formulation of long-range schedule planning which allows a high degree of user interactivity and presentation of supporting data.

It is another object of the invention to provide for presentation of sub-sets of data to a user together with an ordered list of other data in a serial fashion to facilitate user interaction and decision making in the development of a complex scheduling plan.

In order to accomplish these and other objects of the invention, a data processing system is provided including a relational database containing data representing a plurality of activities and attributes of the activities, a scheduler application and an interface between said relational database and said scheduler application including an arrangement for editing the attributes and grouping the activities in accordance with edited attributes.

In accordance with another aspect of the invention, a method of operating a data processing system is provided including the steps of developing a database including a plurality of entries, each entry including a plurality of associated attributes, selecting an entry based on at least one of the attributes, presenting at least the selected entry to a user in a first list together with remaining entries as a second list for editing of the first list.

BRIEF DESCRIPTION OF THE DRAWINGS

The foregoing and other objects, aspects and advantages will be better understood from the following detailed description of a preferred embodiment of the invention with reference to the drawings, in which:

FIGS. 6, 7, 8, 9, 10, 11, 12, 13, 14, 15 and 16 are preferred screens developed in accordance with and to facilitate the use of the invention in a preferred application.

DETAILED DESCRIPTION OF A PREFERRED EMBODIMENT OF THE INVENTION

Figure 1:
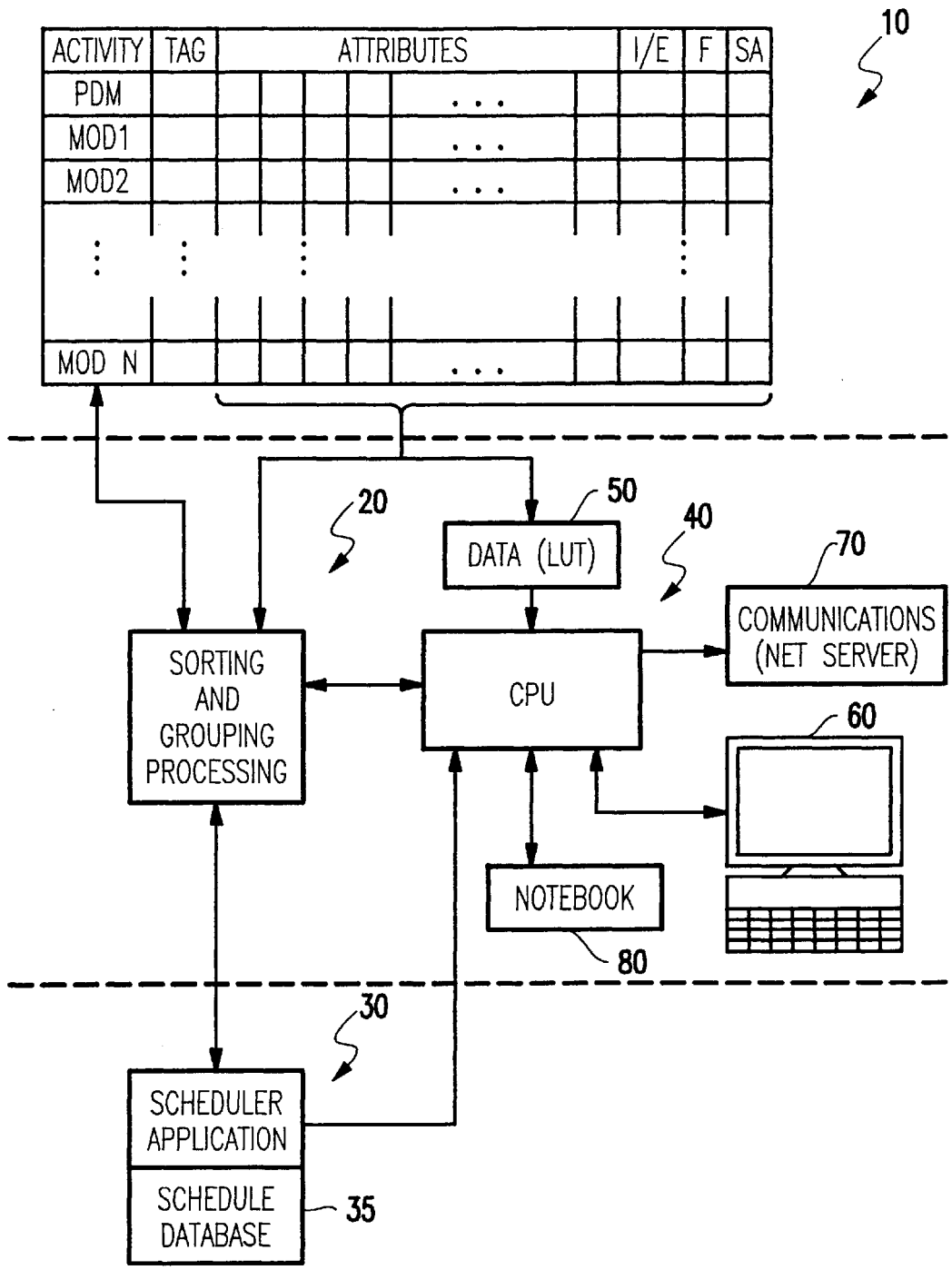
FIG. 1 is a high-level block diagram of a preferred form of the scheduling system in accordance with the invention, FIG. 2 schematically illustrates data flow in accordance with the invention.

Referring now to the drawings, and more particularly to FIG. 1, there is shown a high-level block diagram of a preferred form of the invention. It should be understood that the illustration of FIG. 1 is equally representative of the structure of a special purpose processor or a suitably programmed general purpose computer, in which latter case the functional elements illustrated would be allocated to hardware within the general purpose computer upon invoking the application or initialization of the programming.

The arrangement of FIG. 1 shows the invention as including three principal processing sections and the processor 40 which performs or controls the respective processing sections and develops the user and communications interfaces 60, 70. Relational database 10 contains an entry in a memory structure for each activity to be included within the schedule plan, each entry including a plurality of attributes and flag bits (e.g. 70–100 or more, depending on the complexity, requirements and dependencies of the activity) indicating information associated with the activity. Relational database 10 is preferably implemented with a commercial software relational database application such as Paradox for Windows, Microsoft™ Access '95™ or the like. Similarly, the invention preferably includes a commercially available scheduler application 30 which maintains its own schedule database 35 such as Microsoft™ Project '95™, Primavera™ or the like. The details of any of these programs are not at all critical to the practice of the invention. It is, however, convenient to use database and scheduler programs that are compatible with each other and are written in a programming language which can also be employed for the sorting and grouping processing 20 which forms an interface between them in accordance with the invention. Microsoft Access includes the Access Basic language and Access '95 and Project '95 are preferred commercial products for that reason. The same effect can also be achieved using OS/2™ and Primavera™.

Attribute data may be stored in the relational data base 10 in any convenient form including clear text although some compression or coding reduces memory requirements. Compression and decompression are generally provided as part of the database application. If coding is employed, decoding or clear text which is accessible, for example, in the form of a look up table 50, is preferably provided for the user interface (also generally within the database program if coding is provided) although not particularly necessary for the sorting and grouping processing in which correspondences and similarities of attributes may be found by comparing encoded data in much the same manner as clear text.

Since the invention is intended to provide for user interaction and the user is thus enabled to change the attributes (e.g. start date, completion date, materials, equipment, etc.) corresponding to various activities to be included in the schedule plan, a notebook 80 in the nature of a scratch-pad memory, well-understood in the art, is preferably provided to automatically maintain a record of attribute changes, dates of change, user identification and the like and allowing the user to add commentary to the record of changes to indicate, for example, the rationale for a business decision such as advancing a completion date for obtaining or manufacturing parts on which the activity relies. It has been found useful and is preferred to automatically log all transactions, changes and decisions made during the course of operation of the invention so that a record of all exercises of judgment made by the user in the course of use of the invention can be reported with the completed schedule plan.

Figure 2:
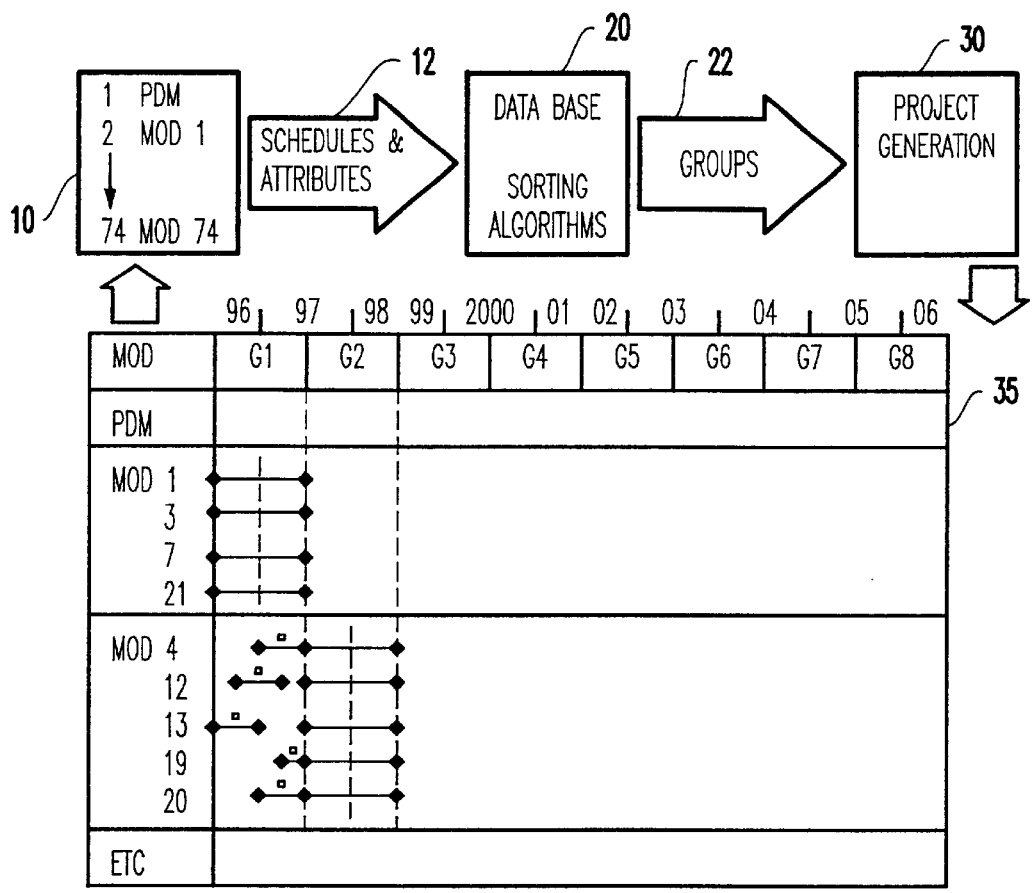

Referring now briefly to FIG. 2, the basic operation of the invention will now be described. The basic process begins with data entry of the activities to be carried out and the attributes of the respective activities to form data base 10. Initial entries need be done only once for each activity since previously entered activities are preferably retrieved from the schedule data base which holds the results of any schedule plan previously developed by use of the invention. The invention need only be used when one or more activities are to be added, a change is to be made or a potential change is to be studied. It is also preferred to retrieve earlier entered data from an existing plan to ensure that the current schedule plan is always used for study and/or modification.

Once the list of activities (hereinafter sometimes referred to as "mods", as a contraction for "modifications" although the activities are not so limited as indicated by the inclusion of a program depot maintenance (PDM) activity) is available in database 10, the attributes, together with any existing schedule information, is transferred (as indicated at 12) for grouping and sorting processing 20 as will be discussed in detail below with reference to FIGS. 5A–16. This processing has the basic purpose of detecting which activities are important to consider in the development of a schedule plan, limiting development of the schedule plan to those activities and, among those, to determine the most important to the schedule plan, referred to as "driver mods" (since the importance or inflexibility of the activity "drives" the schedule plan) and which will form a skeleton of the schedule plan. Then, the activities are traversed in a looping fashion to group the remaining important activities with the "driver mods". As will also be discussed in detail below, the user may alter attributes to determine how the schedule plan will be affected and is prompted at appropriate points of the processing to exercise judgment over the grouping performed by the sorting and grouping processing.

Once the activities which are important to schedule plan development are arranged into a reasonable number of groups, each of which corresponds to a driver mod, the remaining activities can be added to desired groups or additional groups generated, if needed, at the will of the user. The schedule plan may then be further studied and/or refined by the user and the groupings may be evaluated through the final stages of the sorting and grouping processing 20. The groups can then the forwarded for scheduler processing 30 to generate the detailed schedule plan from date information and other attributes in each group. The detailed schedule plan is then stored in the schedule data base 35 and made available for communication through a communications facility such as a network server 70 associated with processor 40.

It is also useful to note from FIG. 2 in regard to the basic operation of the invention that the schedule data base is depicted in the form of a time line. Thus the mods of a first group, for example, designated mod1, mod3, mod7 and mod21 which form a group are depicted as occurring simultaneously or concurrently during the first period G1 of the plan which begins at approximately the present time. (It is considered helpful to show the entire period for a group where activities remain in process.) Similarly, mod4, mod12, mod13, mod19 and mod20 form another group depicted as occurring simultaneously or concurrently during period G2. Operations which must occur prior to each of the mods of this second group are depicted as occurring during period G1 (or, if prior to period G1, they may be associated with an earlier period which remains in the schedule plan for that reason). This information is also useful since it enables these operations to be tracked and scheduled closely before the activity so that the overhead due to the cost of such operations (e.g. cost of parts, warehousing, transportation and the like) can be kept to a minimum in accordance with so-called "just-in-time" management protocols.

Figure 3:
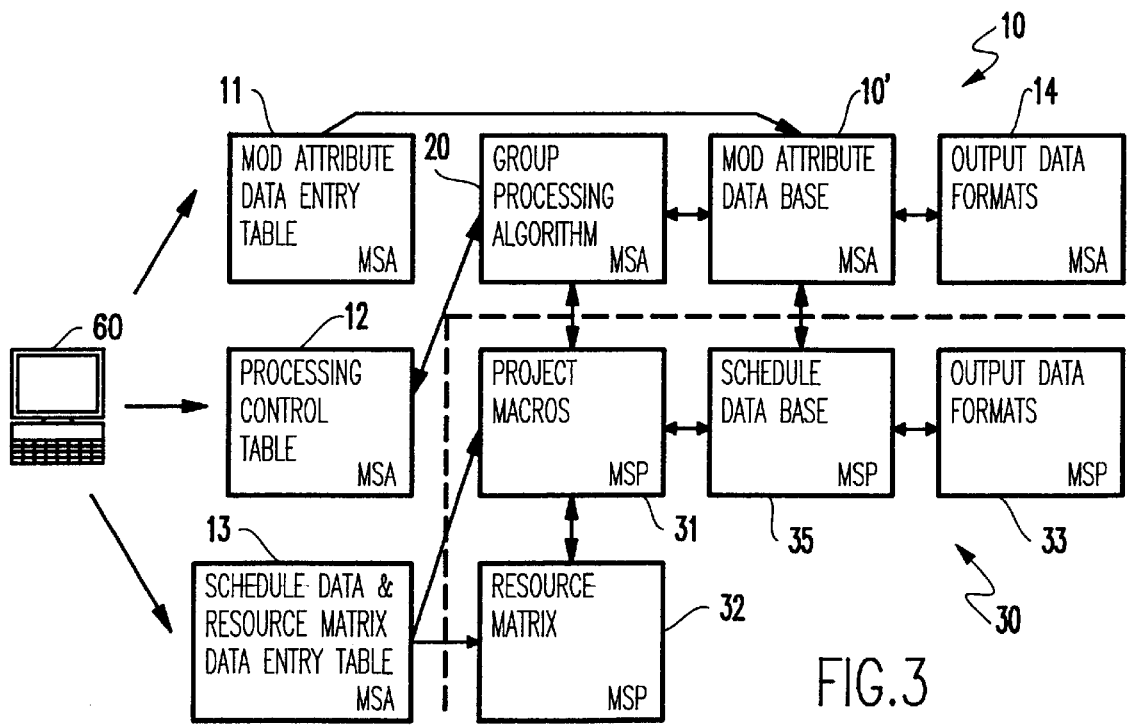
FIG. 3 illustrates interaction of software applications with an interface therebetween in accordance with the invention.

Referring now to FIG. 3 the communications between modules of the database and scheduler applications and the sorting and grouping processing discussed above in connection with FIGS. 1 and 2 are shown in greater detail. To relate FIG. 3 to FIG. 1, activity database 10 (together with the sorting and grouping processing 20) and scheduler 30 are shown separated by a dashed line while communications between modules of these respective applications are depicted. It should be noted that the activity database 10 preferably provides a data entry interface preferably in the form of tables 11, 12, 13 and the data so entered can be communicated to the activity database memory, more particularly indicated by reference numeral 10', the sorting and grouping processor 20 and the project matrix 31 and resource matrix 32 of the scheduler 30, respectively. Logging of transactions through the processing control table 12 provides the function of notebook 80. The project matrix 31 and the resource matrix 32 communicate bidirectionally with each other. The sorting and grouping processing 20 thus provides an interface between the activity database storage 10' and the projects matrix 31 while allowing user interaction with either or both.

Figure 4:
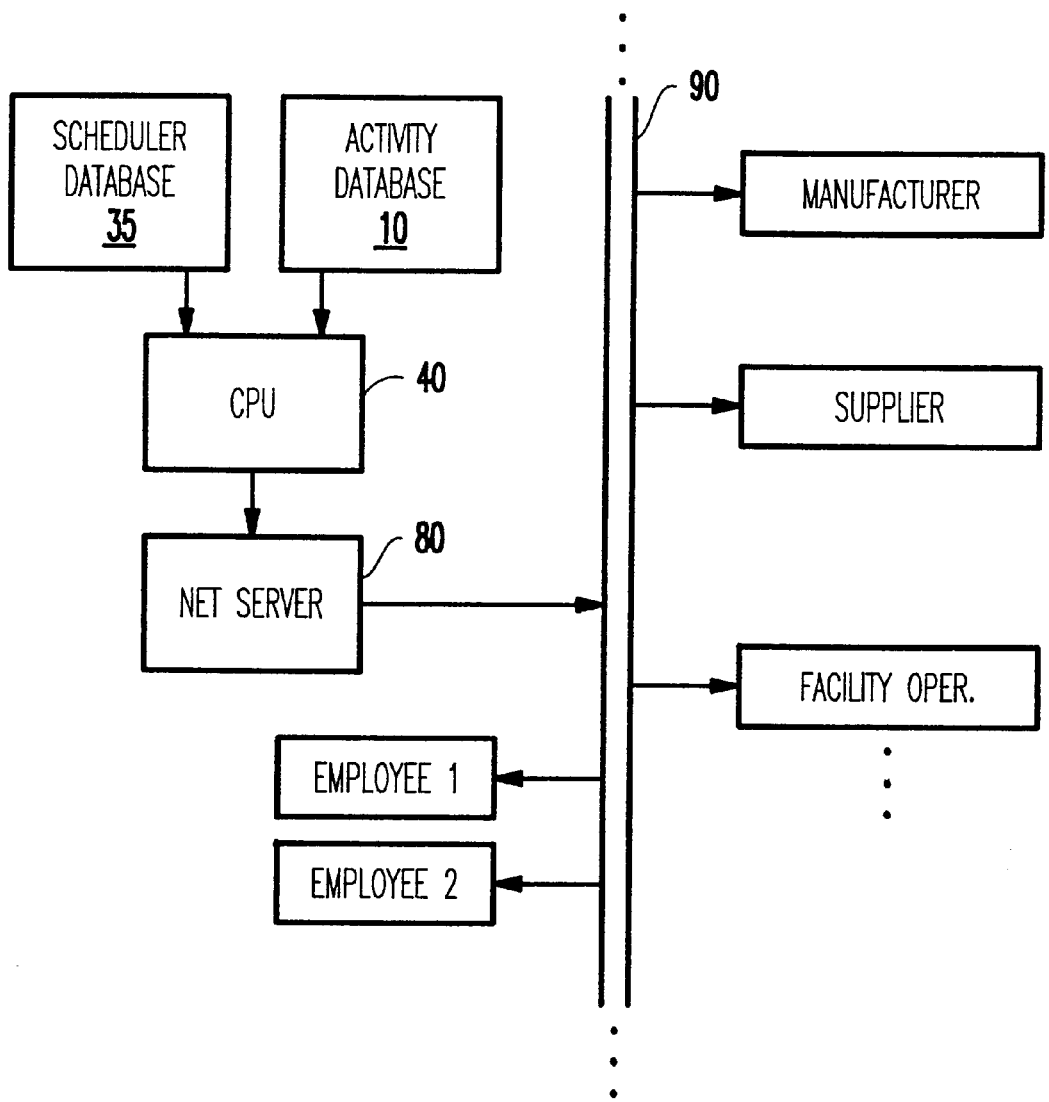
FIG. 4 illustrates a preferred implementation of the invention with a communication system, FIGS. 5A and 5B form a detailed flow diagram illustrating operation of a preferred form of the invention.

Once the groups of activities are scheduled and entered in the schedule database 35, other information to form the detailed schedule is communicated directly from selected attributes of the activity database memory 10'. When a schedule plan is modified, data is communicated back to activity database storage 10' from the schedule database 35 so that changes and studies always proceed from the current schedule. Each of the activity database application 10 and the scheduler application 30 has its own output data format interface 14 and 33, respectively. Either or both may include a net server 70 (FIG. 1) or an interface thereto for communication over a local area network or wide area network (including the Internet). 90 for communication to customers, employees, manufacturers, suppliers, facility operators and the like as needed, as shown in FIG. 4.

Figure 5A:
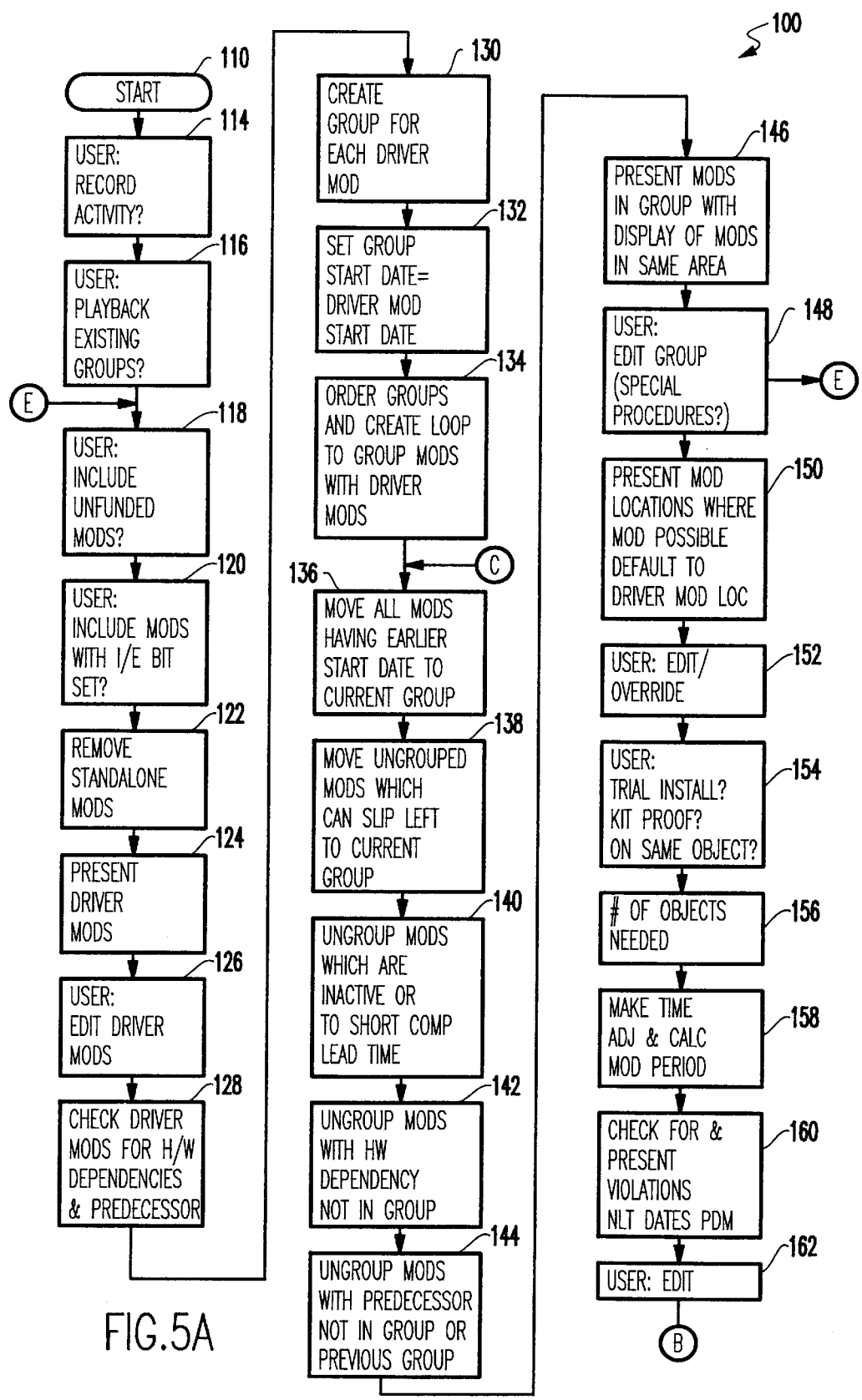
Figure 5B:
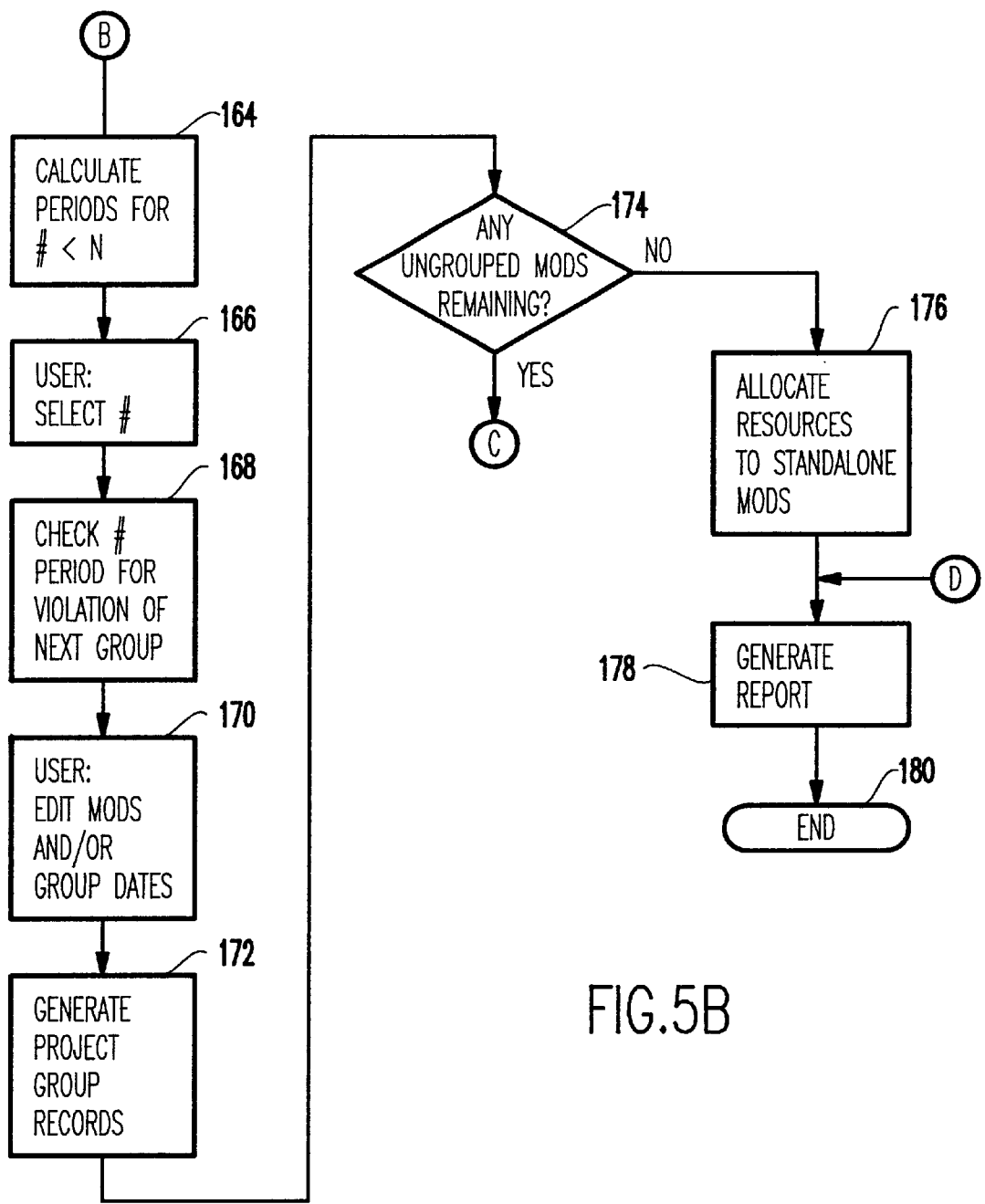

Referring now to FIGS. 5A and 5B, the operation of the invention will be described in detail. It should be understood that FIGS. 5A and 5B illustrate the sorting and grouping processing 20 of FIGS. 1 and 3 as it interacts with the activity database 10, 10' and the projects matrix 31 of scheduler 30. As will be appreciated from the following discussion, compared to previous approaches to schedule processing, the invention moves many of the logical decisions from the schedule processing and provides solutions as well as resolution of conflicts and violations by user interaction. Steps in FIGS. 5A and 5B calling for user interaction are identified by the term "USER:" in the upper left of the block representing the step. At the same time, the user is presented with all necessary information to make those decisions. Further, the user is guided through a logical process whereby the schedule can be rapidly generated, evaluated and optimized. Additionally, as compared to previous approaches, the attributes are removed from the decision-making logic embodied in the program (which cannot be changed without costly and time-consuming program revision) and are treated as data; not only allowing but encouraging modification thereof for solution and optimization of the schedule plan.

Figure 6:
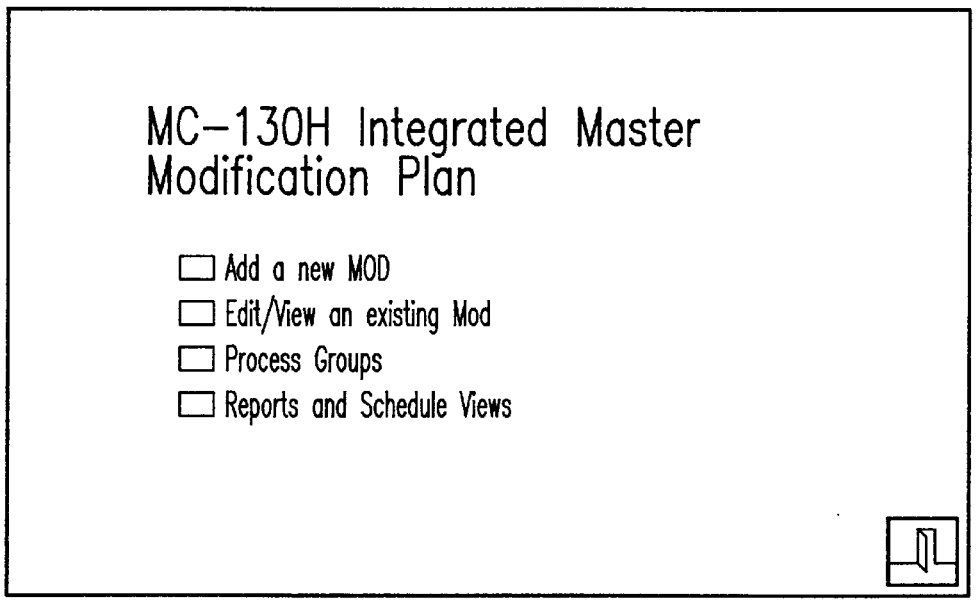
Figure 8:
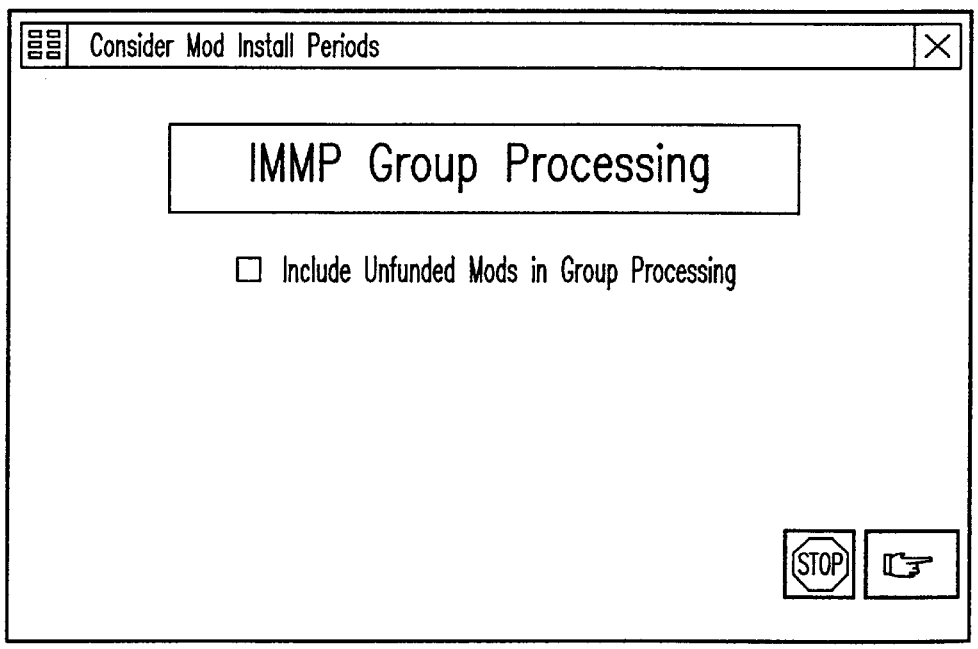

When the process 100 is invoked (Start 110) the user is prompted by a screen preferably similar to that of FIG. 6 which allows control of the location in the process at which the user wishes to enter it. Specifically, if the user selects "ADD A NEW MOD", the process will be started at 114 of FIG. 5A and if the second selection, "EDIT/VIEW AN EXISTING MOD" is selected, step 114 will be bypassed and the process will begin at step 116. Similarly, if the third selection, "PROCESS GROUPS" is selected, the process will be entered at step 118. The last selection provides for entering the process at "D", step 178, to generate reports under control of the scheduler 30 representing the current schedule plan.

Assuming the user selects the first option and enters the program at 114, the user is prompted to enter data corresponding to a new activity with a screen which is preferably similar to that of FIG. 7. This screen is preferably customized for the particular purpose for which the plan is intended but may be generic. In either case, the screen format and text can usually be customized from the commercial database 10 or the operating system (e.g. Windows 95™) in a manner well-understood in the art but unimportant to the practice of the invention. Even if customization must be done as an incident of software development, the screen designs are a part of the interface (e.g. 14, 33 of FIG. 3) and do not require extensive modification of other functional parts of the program. It should be noted from FIG. 7 that an acquisition data dialog box is preferably provided, allowing the user to indicate whether an activity is funded or not (which sets flag bit F in the attributes of FIG. 1) and whether the activity is to be included in the processing (which sets flag bit I/E of FIG. 1 to force exclusion if not set). In the same manner, stand-alone mods may be designated (setting flag bit SA of FIG. 1) and selection of an activity as a driver mod can be similarly forced.

Similarly, other dialog boxes or tables are provided for specification of other attributes such as technical definition, installation information, program risk and dependencies. If desired or necessary, other sub-screens of a similar nature can be called for further types of information such as cost data, schedule data, technical information and the like using on-screen cursor selectable areas such as 701 or keyboard definitions. Additional information such as the project name, mod number and priority:can be included as desired on any of these screens. A screen such as that of FIG. 7 will also be used to present data already existing in database 10 when imported from schedule database 35 at step 116 of FIG. 5A.

The sorting process actually begins after the database 10 is completed at step 118 at which the user is prompted to specify whether particular activities are to be included or not based on the F bit, indicating whether the activity is currently funded. A screen such as that shown in FIG. 8 may be provided for the purpose. Based on user input in response thereto, this sort provides the capability of comparing the effects on the schedule plan when funding for an activity is provided and the activity should be carried out. For example, the user may include unfunded activities with funded activities in an evaluation for the purpose of establishing a funding profile for the unfunded activities and determination of economies which could be realized if funding allocation is altered or obtained by certain dates.

Similarly, step 120 provides for forced exclusion of an activity from the processing based of the I/E bit. This facility allows accumulating data for an activity while the activity, itself, is being planned and evaluation of the effect of the activity on the schedule plan on the basis of the best available information even though the available information may be too incomplete for the total activity information to even be considered "valid" (at which point the user would presumably set the I/E bit as described above).

The next sort 122 is to remove so-called stand-alone mods which are considered to be those activities with no dependencies or special requirements which can be carried out at any location at any time and thus need not be considered in the schedule plan until the detailed schedule is produced. Determination of stand-alone mods can be forced by data entered through the screen of FIG. 7 in the same manner that driver mods may be forced or determined by applying criteria to the attributes of the activity.

Step 124 sorts the activities to determine the driver mods which are either forced, as described above, or have attributes indicating requirements or dependencies which cannot be readily accommodated by other plan adjustments and thus must be considered to "drive" the schedule plan development. When determined, the driver mods are presented to the user by a screen preferably similar to that of FIG. 9. The screen of FIG. 9 provides a table of driver mods sorted by date and a second table of non-driver mods sorted by priority. Using this screen, the user can edit the list of driver mods by additions and deletions, as desired as indicated by step 126 of FIG. 5A. Once the list of driver mods is acceptable to the user, the process proceeds to step 128 in which the driver mods are checked for hardware dependencies (e.g. software cannot be installed until the hardware has been installed to receive it) and predecessor activities (which indicate the earliest date at which the activity can be performed such that the activity cannot be allowed to "slip left" to an earlier date than its predecessor) at step 128. If a violation is found where a driver mod is scheduled prior to its hardware dependency or predecessor, if its dependency or predecessor is a driver mod, a reordering of the driver mods is required and carried out automatically. The user can intervene by again displaying the screen of FIG. 9 to edit the start dates of the driver mods or remove driver mods from the driver mod list. Of course, deletion of an activity which is a hardware dependency or predecessor of another driver mod activity should not be permitted but within the possibility for an activity to be "slipped left", new start dates for the dependency or predecessor may be entered. Such changes are essentially an alteration of attribute data as a speculative business decision (e.g. that parts can actually be obtained in less than a fixed time) and are logged in a notebook memory, as alluded to above, so that they may be restored to an original or any prior state if a schedule solution is not found or if it is later found that the change cannot actually be accommodated or accomplished.

Once an ordered list of driver mods is established, a group of activities is created (although the group will not yet have members) for each driver mod at step 130 and the group install start date is set to the date of the driver mod start date at step 132. The groups are placed in a like order and a loop is created to group other mods with each driver mod, starting with the group having the earliest group start date at step 134 as the current group. (All loops may be generated concurrently or a loop may be created as each driver mod/group is taken up for processing; in which latter case the process loop to "C" would be to step 134 rather than 136, as shown in FIG. 5A.)

For convenience, mods are added to the current group and then ungrouped as conflicts are found. For example, at step 136, all mods having a start date earlier than the current group start date are added to the group and at step 138, all mods which could "slip left" to an earlier start date than the current group are added to the group. Then, at step 140, lead time (e.g. preaward negotiations, design, development and an additional period such as thirty days) is summed if the mod is not active (e.g. in process) and the mod is ungrouped if the lead time is insufficient. This ungrouping can be overridden by the user and the short lead time logged in notebook 80 (FIG. 1) so that steps can be taken to meet the reduced lead time.

Similarly, mods with hardware dependencies not in the present group or a previous group are ungrouped. (All previous group hardware dependencies will have been considered and, if the hardware dependency is satisfied by a mod in a prior group, the mod is no longer hardware dependent.) This handling of hardware dependencies allows them to be satisfied and the dependency removed from consideration (although duly logged in notebook 80) at the earliest possible point in the processing. Further, activities which can be conducted concurrently with their dependencies are performed at the earliest possible time. A similar rationale applies to the ungrouping of mods with predecessors in step 144.

Once some of the mods are ungrouped in steps 142 and 144, the remaining mods in the group are sorted by area of the object on which the activity is to take place. For instance, in an aircraft numerous mods may require the removal of a substantial portion of structure such as an engine or heat exchanger. Therefore, in the interest of efficiency, it may be desirable to alter dates of mods which may have been rejected for the current group in steps 136 and 138 so that they can be included in the group. Recalling that the grouping was done in those steps based upon dates, changes of dates is effectively a discretionary advance of dates and an alteration of data in the database 10 which must be duly logged in notebook 80 in order to accommodate the advance of their dates (e.g. by ordering parts for earlier delivery) or the return of data to its original state.

The mods in a current group which are directed to a particular area are preferably presented to the user by a screen similar to that of FIG. 10. This screen is similar to that of FIG. 9 in that a list of grouped mods is presented in a table and another table is provided to present a list of other mods which could be included. This screen thus prompts the user to edit the list of mods by advancing the dates of some mods to be included in the group or by deleting mods which might extend the completion date or require a particular location or procedure (e.g. a flight test) inconsistent with other mods from the group if it were unavoidable that further mods would be required to the same area at a later date. It should be noted that altering dates of activities or mods will require re-entering the process at step 118 so that all decisions are applied to all mods.

An additional screen such as that of FIG. 11 can be employed to evaluate impacts of special required procedures in the course of this editing process by the user. Specifically, since such special procedures (and flight testing in particular) are generally expensive, it is generally advantageous to cover as many mods with the same special procedure as possible; possibly resulting in advancement of ungrouped mods into the group or deletion of other grouped mods from the group to be performed and tested in other groups with later performed mods.

Next, the mods of the current group are presented grouped by the locations (e.g. facilities, as distinct from areas of the object) where the mods are possible. Again, this is preferably presented using a screen such as that shown in FIG. 12 with sorted lists of grouped and ungrouped mods at step 150. At the same time, the location is set as a default to the location of the driver mod. The user is then prompted to edit the grouped mod list and/or override the default location if the driver mod can be performed elsewhere, although at potentially a greater risk, at step 152. Again, this is a mangement or business decision and should be duly logged or recorded in notebook 80.

The above step generally serve to optimize the current group to include all the activities which can be accommodated together at the same time and completion date at a single location. The following steps assist in evaluation of the grouping, allow an additional opportunity for editing the group and provide for the appropriate number of objects on which the activity is to be carried out.

Specifically, step 154 queries the user about preferred procedures such as if the mod should involve a trial installation (which may vary in dependence on potential interactions and interrelationships with other concurrent or prior mods) or whether a "kit proof" or both a trial installation and "kit proof" is to be employed. (A "kit proof" is a validation and/or verification of technical installation and usage instructions.)

These procedures may involve the same special procedures but the special procedures may require separate performance. For example, the trial installation and kit proof may or may not be testable in the same flight test of a single aircraft. If not, then a plurality of separate objects must be provided to undergo different mods of the group which involve separate special procedures. This, in turn, will probably require an adjustment of the amount of time required for completion of the group of mods (step 158). A screen such as that shown in FIG. 13 is preferably provided to aid in the estimation of the adjusted time for completion. Specifically, the screen of FIG. 13 provides for direct entry of a time adjustment factor for the first mod to be done together with a lag time of beginning the mod on another object to accommodate both installation and testing or the like.

The sum of additional installation periods for other objects is then computed and adjusted by a group install reduction factor reflecting economies of time due to presence of several objects at the facility for undergoing the installation of a group of mods which do not proceed concurrently and computes the actual number of work days for completion of the group of mods on all objects. It should belunderstood that the parameters and calculation shown are arbitrary and any parameters and calculation can be input by the user in making this time adjustment factor for multiple objects being subjected to a group of activities.

The resulting completion date may thus be extended relative to the completion date for a group of mods on a single object and NLT ("not later than") violations are checked at step 160, allowing them to be resolved by user editing at step 162 preferably using a screen similar to that shown in FIG. 14. The completion date could also be reduced by reducing the number of objects on which the group of mods is carried out. Accordingly, the invention provides for using the data input through the screen of FIG. 13 to compute completion dates for the group of mods performed on a lesser number of objects at step 164, allowing the user to select an acceptable number of objects with an associated acceptable completion date at step 166 which is then checked for violation of the start date of the next group at 168.

Figure 15:

The user is then given the option of further editing the mods or the group dates at step 170 and a screen similar to that of FIG. 15 is preferably provided to allow the user to ascertain the feasibility of allocating specific objects (e.g. aircraft) to this group of activities. Similarly, a screen such as that shown in FIG. 16 is provided to allow the user to resolve driver overlap. Resolution of any inter-group violation, driver overlap and object availability essentially completes the sorting an grouping process for the current group and the records for the current group can be transferred to the scheduler to generate the detailed schedule in due course at step 172. Again, throughout the group processing, all user decisions and exercises of judgement are preferably logged to become part of the permanent record that describes the schedule plan developed as described above.

The process can then proceed to the next mod group and driver mod by checking for remaining ungrouped mods (e.g. those mods remaining after step 122) at step 174 and looping to "C" (step 136) to process succeeding groups until no ungrouped, included mods remain, transferring data to the scheduler 30 each time step 172 is executed. In this regard, the user may wish to generate one or more further groups by forcing a remaining mod to be selected as a driver mod or remove one driver mod and substitute one or more others, as discussed above. This can be done at any point in the schedule plan development process in accordance with the invention. Further, the user can return to any previous point in the process described above from any screen as is well-understood in the art, using data modification records from the notebook 80 to restore data or not as may be desired.

When no ungrouped, included mods remain, the process branches at 174 to allow the user to allocate resources to the standalone mods which, it will be recalled, are to be included in the plan but are of such a character (e.g. short completions time, flexibility as to parts, personnel and facility, etc.) that they can be included without significant effect or impact on completion dates at points in the schedule plan which will invariably be developed. This process is performed at step 176 of FIG. 5B and is preferably carried out by review of screens such as those of FIGS. 9, 10, 12 and 13. As each standalone mod is assigned to a group, that assignment is transferred to scheduler 30 so that, when all standalone mods have been assigned to a group, the scheduler will be in possession of all data in the plan with the data organized in a fashion that the generation of a detailed plan containing all attribute information is very straightforward and principally involves collection of data from the attributes of the activities of each group and establishing the schedules of precursor operations (e.g. procuring of parts, movement of objects and the like) for each group, such as those operations occurring in period GI of FIG. 1 but relating to the activities of the group of activities to be performed during period G2. This collection of schedule plan detail data may then be presented as reports defined in any desired manner as is well-understood in the art and such reports can be transmitted as needed over any desired distribution system such as that depicted in FIG. 4, as described above.

In view of the foregoing, it is seen that the invention provides a high degree of user interaction and maintains a high degree of flexibility and applicability to a variety of complex planning tasks without requiring significant programming alteration other than customization of user interface screens. Further, alteration of data can be done simply by changing of attribute entries or addition or deletion of activities in a database and does not involve changes of the logic applied thereto. The user is constrained into a logical process of consideration of a sequence of small and manageable portions of an arbitrarily complex problem and is presented with all pertinent data for making logical choices within the process framework as those decisions are needed. The invention thus provides for a high degree of optimization of the schedule plan and includes procedures for evaluation and immediate editing of the plan as well as rapid generation and distribution thereof.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A system for developing a schedule for managing a project, including:
    a relational database containing data representing a plurality of activities and attributes representing complications, requirements and dependencies of respective ones of said activities stored in a memory,
    a scheduler application, and
    an interface between said relational database and said scheduler application, said interface including
    means for displaying a serial string of questions to a user together with data from said relational database which assist a user in answering said questions, including means for defining a list of questions in a predetermined sequence that must be answered for developing said schedule and means for providing a series of display screen containing said questions and data from said relational database which assist a user in answering said questions, to allow said user to define and edit one of activities and attributes of at least one of said plurality of activities stored in memory by answering said questions displayed in said display screen;
    means for editing said attributes, said editing means including means for allowing a user to input answers to said questions;
    means for storing said edited attributes in memory;
    means for grouping said activities in accordance with said edited attributes; and
    means for generating a schedule based on said activities grouped by said grouping means,
    wherein said displaying means displays said serial string of questions and said editing means edits said attributes before said generating means generates said schedule.

2. A system as recited in claim 1, wherein said interface further includes
    a notebook for logging changes to said attributes made by said means for editing.

3. A system as recited in claim 1, wherein said interface further includes
    means for determining driver activities among said activities, and
    means for forming a group of activities in accordance with each said driver activity.

4. A system as recited in claim 3, wherein said interface further includes
    means for defining an activity as a driver activity.

5. A system as recited in claim 3, wherein said interface further includes
    means for determining a driver activity from said attributes of one of said activities.

6. A system as recited in claim 3, wherein said editing means includes
    means for concurrently presenting to a user all activities included in a group and a list of activities which are not included in a group.

7. A system as recited in claim 1, further including
    means for forcing exclusion of an activity from operation of said means for grouping.

8. A system as recited in claim 7, wherein said means for forcing exclusion includes
    means for designating an activity as one of a stand-alone activity or an unfunded activity.

9. The method of claim 2, wherein said notebook automatically logs changes to said attributes made by said means for editing.

10. The method of claim 9, wherein said notebook includes means for allowing a user to enter commentary in association with said changes which have been automatically logged.

11. A method for developing a schedule for completing a project, including the steps of:
    developing a database including a plurality of entries, each entry including a plurality of associated attributes representing at least one of complications, requirements and dependencies corresponding to respective ones of said entries, said entries and said attributes being stored in a relational database,
    selecting at least one entry from among said plurality of entries based on at least one of said attributes,
    presenting said entry selected in said selecting step to a user in a first list together with other ones of said entries in a second list,
    editing said second list in accordance with steps that include:
        (a) displaying, in a series of display screens, a serial string of questions that must be answered for developing said schedule in a predetermined sequence, together with data from said relational database which assist a user in answering said questions to prompt a user regarding editing and to allow said user, by answering said questions displayed in said display screen, to define and edit attributes of at least one entry in said second list, and (b) editing one of said entries and said attributes of said at least one entry based on answers to said questions input by a user; and generating a schedule based on said second list as edited in said editing step, wherein said displaying means displays said serial string of questions and said editing means edits said attributes before said generating means generates said schedule based on the answers to said questions.

12. A method as recited in claim 11, including the further step of selecting entries from said second list in accordance with said attributes.

13. A method as recited in claim 11, including the further step of ordering said entries of said second list in accordance with said attributes.

14. A method as recited in claim 11, including the further steps of:

displaying said edited list modified in accordance with said editing step.

15. A method as recited in claim 14, including the further step of selecting entries from said second list in accordance with said attributes.

16. A method as recited in claim 14, including the further step of ordering said entries of said second list in accordance with said attributes.

17. A method as recited in claim 14, including the further step of recording content of each said editing step.

18. A method as recited in claim 11, including the further step of grouping another entry with said selected entry in accordance with an attribute of said another entry.

19. A method for generating a schedule for managing a project, said schedule being displayed on a display screen of a computer running a scheduling applications program, said method comprising:

(a) storing information in a relational database, said information including activity information indicative of activities to be performed for completing the project and attribute information indicative of at least one attribute representing at least one of complications, requirements and dependencies corresponding to each of said activities;

(b) designating at least one driver activity from the activity information stored in said database;

(c) identifying as non-driver activities at least a subset of those activities not designated in said designating step;

(d) creating a group of non-driver activities for the driver activity designated in step (b), said group being created based on a relationship between at least one attribute of the non-driver activities in said group and at least one attribute of said driver activity;

(e) displaying an interactive display screen listing the driver activity and the non-driver activities in said group corresponding to said driver activity, said screen including a format identifying the driver activity as a driver activity and identifying the non-driver activities as non-driver activities, said screen further having means for prompting a user regarding editing and allowing a user to modify one or more of the non-driver activities at the user's discretion, said stet of displaying an interactive display screen including steps of defining a list of questions in a predetermined sequence that must be answered for developing said schedule, designing a series of display screens containing said questions and data from said relational database which assist a user in answering said questions, and defining at least one of activities and attributes required to answer said questions displayed in said display screen; and (f) forming a schedule for managing the project based on the activity information in said database corresponding to said driver activity and said group of non-driver activities corresponding to the driver activity, including any modifications made to said group in step (e) based on the answers to said questions.

20. A method as recited in claim 19, wherein the step of creating said group of non-driver activities includes at least one of the following steps:

(g) adding one or more non-driver activities not previously in said group to said group, said adding step being performed as a result of a decision of a user; and (h) deleting one or more non-driver activities which are in conformance with said desired attribute from said group, said deleting step being performed as a result of a decision of a user.

21. A method as recited in claims 20, wherein any one of steps (f),(g), and (h) are performed by a user in accordance with one or more interactive display screens.

22. The method of claim 19, wherein in step (e), wherein said display screen listing the driver activity and non-driver activities and the means for modifying the non-driver activities is displayed before the schedule is formed for managing the project.

23. The method of claim 19, wherein in step (e), a modification performed by a user using said means includes at least one of changing an attribute of one or more of the non-driver activities and deleting one or more of the non-driver activities.

24. The method of claim 23, wherein one or more of the non-driver activities are modified, the non-driver activities in said group are automatically re-ordered based on the modification.

25. The method of claim 19, further comprising:

displaying at least a portion of the non-driver activities in said group corresponding to said driver activity based on one of area of an object on which the non-driver activities are to take place, an installation location, and special procedures required by the non-driver activities.

26. The method of claim 19, wherein the schedule formed in step (e) schedules at least two of the non-driver activities in said group to be performed simultaneously.

27. The method of claim 26, wherein the schedule formed in step (e) schedules the two non-driver activities based on hardware dependencies of the two non-driver activities.

28. The method of claim 19, wherein in step (b) the user designates said at least one driver activity.

29. The method of claim 19, wherein modifications of one or more of the non-driver activities by the user are stored in a scratchpad memory in order to develop a record of user decisions used to form the schedule formed in step (f).

30. A method for generating a schedule as recited in claim 19, wherein said at least one driver activity is designated on a basis of whether said driver activity is funded.

31. A method for generating a schedule for managing a project, said schedule being displayed on a display screen of a computer running a scheduling applications program, said method comprising:

(a) storing information in a relational database, said information including activity information indicative of activities to be performed for completing the project and attribute information indicative of at least one attribute of each of said activities;

(b) designating at least one driver activity from the activity information stored in said database;

(c) identifying as non-driver activities at least a subset of those activities not designated in said designating step;

(d) creating a group of non-driver activities for the driver activity designated in step (b), said group being created based on a relationship between at least one attribute of the non-driver activities in said group and at least one attribute of said driver activity; and (e) forming a schedule for managing the project based on the activity information in said database corresponding to said driver activity and said group of non-driver activities created for said driver activity; and wherein step (b) is performed in accordance with steps that include:

identifying activities having a desired attribute from said activity information and said attribute information stored in said database;

designating the activities having said desired attribute as driver activities;

displaying a list of said driver activities on the display screen of said computer, including defining a list of questions in a predetermined sequence that must be answered for developing said schedule, designing a series of display screens containing said questions and data from said relational database which assist a user in answering said questions, and defining at least one of activities and attributes required to answer said questions displayed in said display screen;

editing said list to form an edited list of driver activities; and performing steps (c) and (d) for each driver activity in said edited list of driver activities, wherein step (e) includes generating a schedule, said schedule being generated based on the answers to said questions for managing the project based on the activity information in said database corresponding to said driver activities and the group of non-driver activities formed for each of said driver activities.

32. A method as recited in claim 31, wherein said editing step includes deleting from said list driver activities which do not have a second desired attribute.

33. A method for generating a schedule for managing a project, said schedule being displayed on a display screen of a computer running a scheduling applications program, said method comprising:

(a) storing information in a relational database, said information including activity information indicative of activities to be performed for completing the project and attribute information indicative of at least one attribute of each of said activities;

(b) designating at least one driver activity from the activity information stored in said database;

(c) identifying as non-driver activities at least a subset of those activities not designated in said designating step;

(d) creating a group of non-driver activities for the driver activity designated in step (b), said group being created based on a relationship between at least one attribute of the non-driver activities in said group and at least one attribute of said driver activity, including defining a list of questions in a predetermined sequence that must be answered for developing said schedule, designing a series of display screens containing said questions and data from said relational database which assist a user in answering said questions, and defining at least one of activities and attributes required to answer said questions displayed in said display screen; and (e) forming a schedule for managing the project based on the activity information in said database corresponding to said driver activity and said group of non-driver activities created for said driver activity, said schedule being generated based on the answers to said questions, wherein said step (c) includes:

sorting said non-driver activities according to priority information stored in said database, said priority information being stored in association with one of the activity information and attribute information corresponding to said non-driver activities.

34. A method a s recited in claim 33, wherein the step of creating said group of non-driver activities includes:

(f) identifying non-driver activities in said group having attributes which violate a desired attribute; and (g) performing a step of deleting the non-driver activities in said group having attributes which violates said desired attribute, or alternatively performing a step of modifying the attributes of the non-driver activities in said group which violates said desired attribute so as to be conformance with said desired attribute.

35. A method as recited in claim 33, wherein steps (b) and (d) are performed by a user in accordance with one or more interactive display screens.

36. A method as recited in claim 33, further comprising:

sorting said first and second driver activities according to date information stored in said database, said date information being stored in association with one of the activity information and attribute information corresponding to said driver activities.

37. A method for generating a schedule for managing a project, said schedule being displayed on a display screen of a computer running a scheduling applications program, said method comprising:

(a) storing information in a relational database, said information including activity information indicative of activities to be performed for completing the project and attribute information indicative of at least one attribute of each of said activities;

(b) designating at least one driver activity from the activity information stored in said database;

identifying as non-driver activities at leant a subset of those activities not designated in said designating step;

(d) creating a group of non-driver activities for the driver activity designated in step (b), said group being created based on a relationship between at least one attribute of the non-driver activities in said group and at least one attribute of said driver activity; and (e) forming a schedule for managing the project based on the activity information in said database corresponding to said driver activity and said group of non-driver activities created for said driver activity, wherein step (b) includes designating a plurality of driver activities from the activity information stored in said database, and said method further comprising:
  listing said plurality of driver activities chronologically;
  determining whether a violation in said list of driver activities exist based on at least one of hardware dependencies of said driver activities and one of said driver, activities being a predecessor activity of another one of said driver activities;
performing one of (i) removing violating driver activities or (ii) automatically re-ordering said list of driver activities to remove said violation.

38. The method of claim 37, further comprising:
defining a list of questions in a predetermined sequence that must be answered for developing said schedule;
designing a series of display screens containing said questions and data from said relational database which assist a user in answering said questions; and
defining at least one of activities and attributes required to answer said questions displayed in said display screen, said schedule being generated based on the answers to said questions.

* * * * *

UNITED STATES PATENT AND TRADEMARK OFFICE
CERTIFICATE OF CORRECTION

PATENT NO. : 6,609,100 B2
DATED : August 19, 2003
INVENTOR(S) : Lloyd E. Smith and Edward W. Balunas It is certified that error appears in the above-identified patent and that said Letters Patent is hereby corrected as shown below:

<u>Title page,</u>
Item [73], change Assignee, "Lockhead Martin Corporation" to read -- Lockheed Martin Corporation --.

Signed and Sealed this

Eighteenth Day of November, 2003

JAMES E. ROGAN
*Director of the United States Patent and Trademark Office*